United States Patent
Keller et al.

(10) Patent No.: US 9,294,618 B2
(45) Date of Patent: Mar. 22, 2016

(54) CALL-BACK TO A UE THAT HAS MADE AN EMERGENCY CALL VIA A VISITED IMS NETWORK

(71) Applicants: Ralf Keller, Wurselen (DE); Fredrik Lindholm, Stockholm (SE)

(72) Inventors: Ralf Keller, Wurselen (DE); Fredrik Lindholm, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/390,462

(22) PCT Filed: Mar. 15, 2013

(86) PCT No.: PCT/SE2013/050281
§ 371 (c)(1),
(2) Date: Oct. 3, 2014

(87) PCT Pub. No.: WO2013/151484
PCT Pub. Date: Oct. 10, 2013

(65) Prior Publication Data
US 2015/0181033 A1    Jun. 25, 2015

Related U.S. Application Data

(60) Provisional application No. 61/619,562, filed on Apr. 3, 2012.

(51) Int. Cl.
*H04M 3/42*    (2006.01)
*H04L 29/06*    (2006.01)
(Continued)

(52) U.S. Cl.
CPC ......... *H04M 3/42195* (2013.01); *H04L 65/103* (2013.01); *H04L 65/105* (2013.01);
(Continued)

(58) Field of Classification Search
CPC ....... H04W 4/22; H04W 8/12; H04W 76/007; H04M 11/04
USPC .......... 455/404.1, 404.2, 433, 456.2; 370/252
See application file for complete search history.

(56) References Cited

U.S. PATENT DOCUMENTS

| | | | |
|---|---|---|---|
| 2008/0089486 A1 | 4/2008 | Madour et al. | |
| 2011/0206036 A1* | 8/2011 | DeWeese | H04M 3/5116 370/352 |

FOREIGN PATENT DOCUMENTS

WO    WO-03/049467    6/2003

OTHER PUBLICATIONS

PCT Notification of Transmittal of the International Search Report and the Written Opinion of the International Searching Authority for Counterpart PCT Application No. PCT/SE2013/050281, (Aug. 13, 2013), 13 pages.

(Continued)

*Primary Examiner* — Sam Bhattacharya
(74) *Attorney, Agent, or Firm* — NDWE LLP

(57) ABSTRACT

Exemplary methods for establishing an emergency call and an emergency call-back for a first User Equipment (UE) communicatively coupled to a visited Internet Protocol Multimedia Subsystem (IMS) network includes establishing an emergency call by the first UE sending an emergency call request to a Proxy Call Session Control Function (P-CSCF) in the visited IMS network. The methods further include providing, from the P-CSCF to a Serving CSCF (S-CSCF) in a home IMS network for the first UE, information comprising an indication that the emergency call has been performed and an equipment identifier of the first UE. The methods further include receiving, in the S-CSCF, an emergency call-back request from an emergency call-center, and using, in the S-CSCF, information comprised in the received emergency call-back and the information provided by the P-CSCF, to route the emergency call-back to the first UE and/or to a second UE.

16 Claims, 6 Drawing Sheets

(51) Int. Cl.
  H04M 3/51    (2006.01)
  H04W 4/22    (2009.01)
  H04W 76/00   (2009.01)
  H04M 1/725   (2006.01)
  H04M 7/00    (2006.01)
  H04M 11/04   (2006.01)
  H04W 8/12    (2009.01)

(52) U.S. Cl.
  CPC ........ *H04L65/1006* (2013.01); *H04L 65/1016* (2013.01); *H04L 65/1036* (2013.01); *H04L 65/1043* (2013.01); *H04L 65/1069* (2013.01); *H04M 1/72536* (2013.01); *H04M 3/5116* (2013.01); *H04M 7/0069* (2013.01); *H04W 4/22* (2013.01); *H04W 76/007* (2013.01); *H04M 11/04* (2013.01); *H04M 2242/04* (2013.01); *H04W 8/12* (2013.01)

(56) References Cited

OTHER PUBLICATIONS

3GPP TS 23.167 V11.4.0, "IP Multimedia Subsystem (IMS) emergency sessions", *3rd Generation Partnership Project, Technical Specification Group Services and System Aspects, (Release 11)*, http://www.3gpp.org/DynaReport/23167.htm, (Mar. 2012), 42 pages.

3GPP TS 23.203 V11.5.0, "Policy and charging control architecture", *3rd Generation Partnership Project, Technical Specification Group Services and System Aspects, (Release 11)*, http://www.3gpp.org/DynaReport/23203.htm, (Mar. 2012), 175 pages.

3GPP TS 23.216 V11.4.0, "Single Radio Voice Call Continuity (SRVCC); Stage 2", *3rd Generation Partnership Project, Technical Specification Group Services and System Aspects, (Release 11)*, http://www.3gpp.org/DynaReport/23216.htm, (Mar. 2012), 64 pages.

3GPP TS 23.228 V11.4.0,_"IP Multimedia Subsystem (IMS); Stage 2", *3rd Generation Partnership Project, Technical Specification Group Services and System Aspects, IP Multimedia Subsystem (IMS), (Release 11)*, http://www.3gpp.org/DynaReport/23228.htm, (Mar. 2012), 287 pages.

3GPP TS 23.237 V11.4.0, "IP Multimedia Subsystem (IMS) Service Continuity; Stage 2 (Release 11)", *3rd Generation Partnership Project, Technical Specification Group Services and System Aspects*, http://www.3gpp.org/DynaReport/23237.htm, (Mar. 2012), 169 pages.

3GPP TS 24.229 V11.3.0, "IP multimedia call control protocol based on Session Initiation Protocol (SIP) and Session Description Protocol (SDP); Stage 3", *3rd Generation Partnership Project, Technical Specification Group Core Network and Terminals, (Release 11)*, http://www.3gpp.org/dynareport/24229.htm, (Mar. 2012), 728 pages.

Camarillo, et al., "Emergency Calls in the IMS", *The 3G IP Multimedia Subsystem (IMS): Merging the Internet and the Cellular Worlds*, Third Edition, XP0055073622, (Oct. 10, 2008), pp. 329-336.

International Preliminary Report on Patentability, Application No. PCT/SE2013/050281, dated Oct. 16, 2014, 8 pages.

* cited by examiner

US 9,294,618 B2

CALL-BACK TO A UE THAT HAS MADE AN EMERGENCY CALL VIA A VISITED IMS NETWORK

CROSS-REFERENCE TO RELATED APPLICATIONS

This application is a National stage of International Application No. PCT/SE2013/050281, filed Mar. 15, 2013, which claims priority to U.S. Application No. 61/619,562, filed Apr. 3, 2012, which are hereby incorporated by reference.

TECHNICAL FIELD

The present disclosure relates to methods and apparatus in a telecommunications network for enabling an emergency call centre to call back to a user equipment that originally established an emergency call via an IMS network.

BACKGROUND

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows person-to-person (client-to-client) as well as person-to-content (client-to-server) communications over an IP-based network. The IMS makes use of the Session Initiation Protocol (SIP) and Session Description Protocol (SDP) to set up and control calls or sessions between user terminals (or user terminals and application servers). Whilst SIP was created as a user-to-user protocol, IMS allows operators and service providers to control user access to services and to charge users accordingly.

FIG. 1 illustrates schematically how the IMS fits into the mobile General Packet Radio Service (GPRS) network architecture. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network (IP-CAN). The GPRS network includes various GPRS Support Nodes (GSNs). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network and network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer 4. Other IMS core network entities shown include a Media Resource Function Controller (MRFC), a Border Gateway Control Function BGCF and a Media Gateway Control Function, (MGCF). The top, Application Layer 6 includes the IMS service network 3b with Application Servers (ASs) 7 for implementing IMS service functionality.

As shown in FIG. 1, a User Equipment (UE) can access the IMS by attaching to an access network and then over the Connectivity Layer 1, which is part of a Packet Switched (PS) domain. For example, the UE may attach via an Evolved Packet Core (EPC)/Long Term Evolution (LTE) access. In that case an IMS session can be set up by the UE using SIP signalling. However, a UE may also access IMS services via a Circuit Switched (CS) domain 8. Although the CS domain will not handle SIP, procedures are well established for dealing with the provision of media and services between the IMS and a UE using a CS access.

3GPP has established standardised procedures specified in Technical Specifications (TS). For example TS 23.228 relates to IMS SIP, TS 23.203 relates to the Policy and Charging Control (PCC) architecture, and TS 23.167 relates to Emergency Calls for IMS. In addition the so-called Single Radio Voice Call Continuity (SRVCC) specifications (TS 23.216 and TS 23.237) deal with the handover of calls from a PS to a CS access network, and specify how emergency calls are routed.

The 3GPP Technical Specifications stipulate that when an emergency call is made to an emergency centre such as a Public Safety Access Point (PSAP), special procedures are applied to ensure that the call is correctly routed and not interrupted. However, there may be situations where the PSAP might want to call-back the UE after the call has been terminated (intentionally or unintentionally terminated). As specified in the standards, an emergency call that is established over the IMS is anchored in the IMS entities that serve the UE through the access network at which the UE was attached when the emergency call was established (i.e. in the visited network, not in the user's Home Network as would be the case for a normal call).

The current procedures for call-back to a particular device require the PSAP to call back to the right device by indicating an equipment identifier or instance ID or Globally Routable User Agent Uniform Resource Identifier (GRUU) provided by the UE during emergency call establishment (see TS 24.229). However, this requires an IP-PSAP with enhanced functionality, something unlikely to be deployed in many countries.

WO03049467 A1 discloses a method and system for call-back in case of an emergency session. The document suggests an emergency call setup similar to the setup of a normal call, thus involving an S-CSCF located in the home network of the UE making the emergency call. However, shown system result in an inefficient emergency call setup that is not in accordance with preferred procedures for emergency call setup.

SUMMARY

It is therefore an object to provide methods and apparatuses that enable call-back to a UE that has made an emergency call via a visited IMS network in an efficient and reliable manner.

According to a first aspect, there is provided a method of performing a call-back from an emergency call-centre to a UE that has established an emergency call to the call centre routed via a visited IMS network. The method includes notifying an S-CSCF in the user's IMS Home Network that the UE has established the emergency call, and providing the S-CSCF with an equipment identifier of the UE. When an emergency call-back request towards the user is received from the emergency call centre at the S-CSCF, the S-CSCF routes the emergency call-back to a UE using the identification information provided.

In particular the first aspect comprises an emergency call and an emergency call-back for a first UE connected to a visited IMS network. The method comprises an establishment of an emergency call by the first UE by sending an emergency call request to a P-CSCF in the visited IMS network. The P-CSCF provides information to an S-CSCF in a home IMS network for the first UE, the information comprising an indication that the emergency call has been performed and an equipment identifier of the first UE. Then the S-CSCF receives an emergency call-back request from an emergency call-centre, whereby the S-CSCF uses the information comprised in the received emergency call-back and the information previously provided by the P-CSCF to route the emergency call-back to the first UE and/or to a second UE.

According to a second aspect a method of establishing an emergency call for a first UE connected to a visited IMS network is provided. The method is performed at a P-CSCF in the visited IMS network and begins with receiving a call-request from the first UE. The P-CSCF determines the received call-request to be an emergency call and sends an invite signal to an E-CSCF in the visited IMS network thereby enabling routing of the emergency call through the E-CSCF. The P-CSCF also provides information to an S-CSCF in a home IMS network for the first UE, the information comprising an indication that the emergency call has been performed and an equipment identifier of the first UE, thereby enabling emergency call back to the first UE.

According to a third aspect a method of performing emergency call-back at an S-CSCF located in a home IMS, network for a first UE is provided. The method begins by receiving information from a P-CSCF located in an IMS network in which the first UE is visiting. The received information comprises an indication that the first UE is making an emergency call in the visited IMS network and an equipment identifier of the first UE. The S-CSCF then receives an emergency call-back request from an emergency call-centre and uses the information comprised in the received emergency call-back request with the information received from the P-CSCF in order to route the emergency call-back to the first UE and/or to a second UE.

According to a fourth aspect, there is provided a telecommunications network entity of a visited IMS network. The network entity includes an interface through which SIP signalling is received and sent, a memory storing data and programming instructions and a processor for implementing the program instructions. On receiving a request to establish an emergency call from a user equipment, UE, accessing the visited network, the network entity is configured to route the emergency call to an emergency call-centre. The network entity is further configured to inform an S-CSCF in the user's IMS Home network that an emergency call has been established.

In particular, the fourth aspect provides a P-CSCF of an IMS network. The P-CSCF comprises an interface transmitting and receiving SIP messages, a memory storing data and programming instructions and a processor for implementing the program instructions. The processor is coupled to the interface and configured to receive a call request from a first UE visiting in the IMS network of the P-CSCF; determine the received call-request to be an emergency call; send an invite signal to an E-CSCF in the IMS network of the P-CSCF, thus enabling routing of the emergency call through the E-CSCF. The processor is also configured to provide information to an S-CSCF in a home IMS network for the first UE, the information comprising an indication that the emergency call has been performed as well as an equipment identifier of the first UE, thereby enabling emergency call back to the first UE.

According to a fifth aspect there is provided a S-CSCF entity of an IMS network that is a home network of a user. The S-CSCF includes an interface through which SIP signalling is received and sent, a memory storing data and programming instructions and a processor for implementing the program instructions. The program instructions configure the S-CSCF to store in its memory a received indication that a UE of the user has established an emergency call which has been routed to an emergency call centre via a visited network, and an equipment identifier of the UE. The S-CSCF is further configured, when receiving an emergency call-back request towards the user sent from the emergency call-centre, to use the stored information to route the call back to the identified UE.

In particular the fifth aspect provides an S-CSCF of an IMS network, the IMS network being a home IMS network for a first UE. The S-CSCF comprises an interface transmitting and receiving SIP messages, a memory storing data and programming instructions and a processor for implementing the program instructions. The processor is coupled to the interface and configured to receive information from a P-CSCF located in an IMS network in which the first UE is visiting. The information comprises an indication that the first UE is making an emergency call in the visited IMS network and an equipment identifier of the first UE from. The processor is further configured to receive an emergency call-back request from an emergency call-centre and to use the information comprised in the received emergency call-back with the information received from the P-CSCF in order to route the call-back to the first UE and/or to a second UE.

Thus, when the establishment of an IMS emergency call is detected, for example by the P-CSCF, then the P-CSCF sends a message (e.g., a SIP INFO message) to the S-CSCF of the user's Home Network where the UE is registered in, to inform the S-CSCF that an emergency call has been established by this subscriber, and to include the equipment identifier of the UE. The S-CSCF then uses this information to route a call-back from an emergency call-centre/PSAP to ensure that it is routed to the right device. The S-CSCF can also suppress any services that should not be invoked for a user during an emergency call-back.

DETAILED DESCRIPTION

Figure 1:
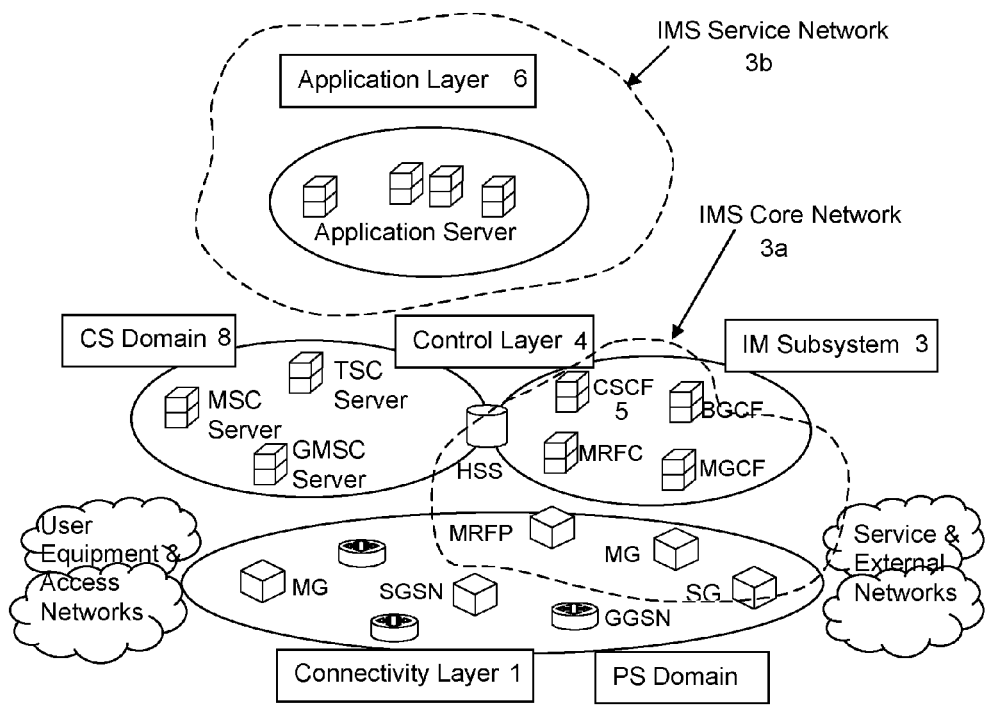
FIG. 1 is a schematic illustration showing how the IMS fits into the mobile General Packet Radio Service (GPRS) network architecture.
Figure 2:
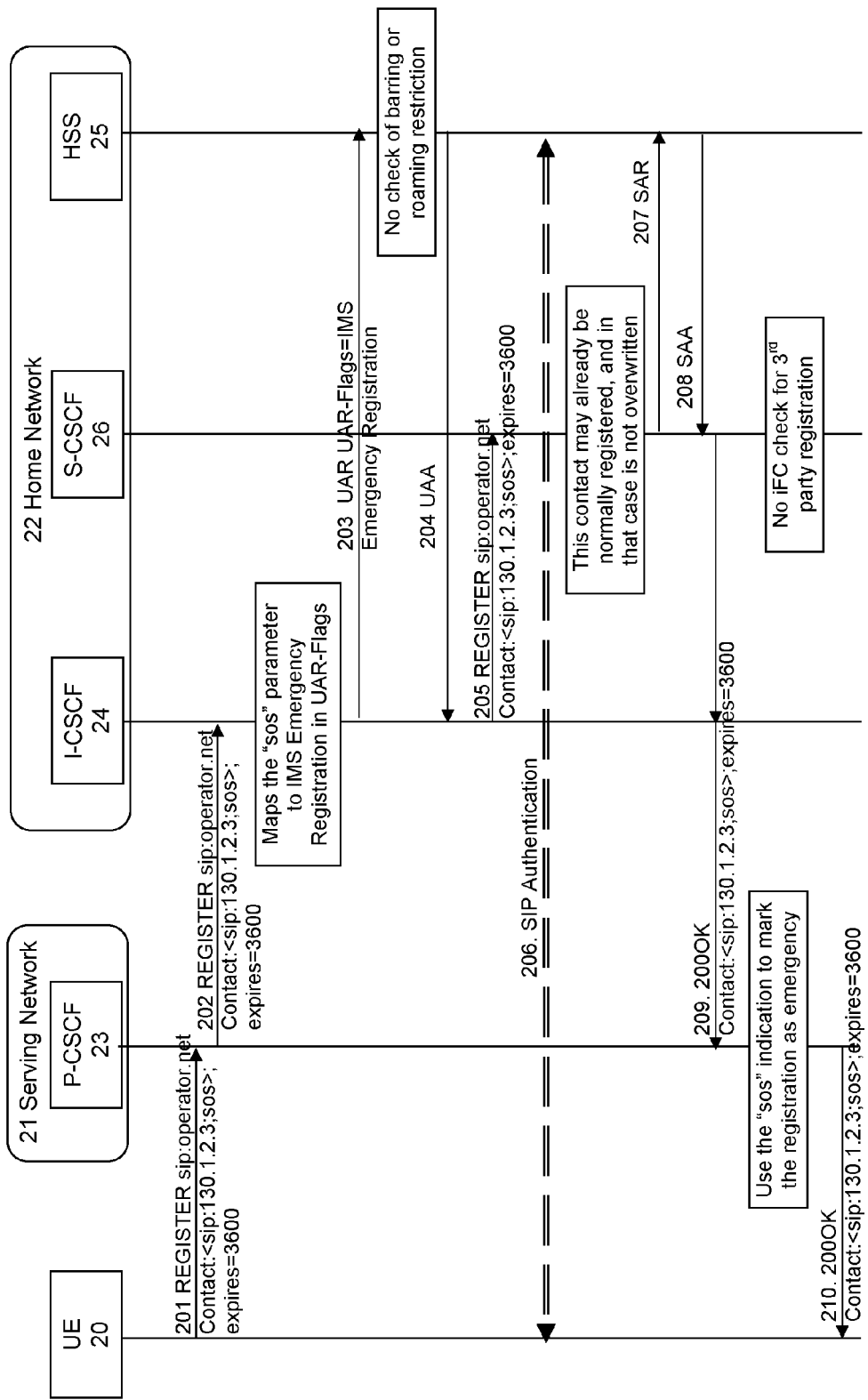
FIG. 2 is a signal diagram illustrating a procedure for an Emergency Registration.

FIG. 2 illustrating a procedure for an Emergency Registration. As shown, a UE 20 accesses a serving, or visited IMS network 21. The UE 20 is a subscriber to a Home IMS network 22. Signal 201 is a SIP Register request sent from the UE 20 to a P-CSCF 23 in the visited network 22. The Register request 201 is a request to register an Emergency call/session and includes an emergency (SOS) parameter. The registration proceeds with the P-CSCF 23 forwarding a Register Request 202, with the emergency parameter, to an I-CSCF 24 in the UE's Home network 22. The I-CSCF 24 maps the emergency parameter to an IMS Emergency Registration by setting an appropriate flag, or flags. The I-CSCF 24 sends a User Authorisation Request (UAR) message 203 to the HSS 25 in the Home network 22 together with the appropriate Emergency registration flags. Because it is for an Emergency call, the HSS skips the usual check for call barring or other restrictions and responds with a User Authorisation Answer (UAA) signal 204. The Registration procedure continues with a SIP register signal sent to an S-CSCF 26 in the Home network 22, which completes the registration by performing applicable authentication procedures, and provides the UE with applicable public user identities from a subscriber profile. Note that this is consistent with the normal registration procedures, where an S-CSCF 26 is assigned to handle the session. If this was a normal registration and not an Emergency registration, the S-CSCF 26 would then be linked into the call path. However, as it is an Emergency call, then in accordance with the specified procedures, it will instead be routed from the P-CSCF 23 to the PSAP via an E-CSCF in the visited network, rather than via the Home network 22.

Signal 205 also includes an indication of a timeout at which the emergency registration will expire. Also, as noted in FIG. 2, if the UE already had a normal registration, then the emergency registration contact information is not overwritten at the S-CSCF 26, so that the normal registration will continue after the emergency registration has timed out.

Signals 206 represent the completion of the SIP authentication procedures. Following exchange of Service Authorisation Request (SAR) signals 207 and 208 between the S-CSCF 26 and the HSS 25, the S-CSCF 26 returns a SIP 200 OK signal 209 to the I-CSCF 24, which is forwarded to the P-CSCF 23. As noted in FIG. 2, because this is an emergency registration, the S-CSCF skips the usual initial Filter Criteria (iFC) check for any third party registration. In signal 209 the S-CSCF 26 may include an indication that it supports an emergency call-back indication. The P-CSCF 23 returns a SIP 200 OK signal 210 to the UE 20. As noted in FIG. 2, the P-CSCF 23 maintains stored information relating to the registration, and uses the emergency parameter to mark the registration as an emergency registration.

Figure 3:
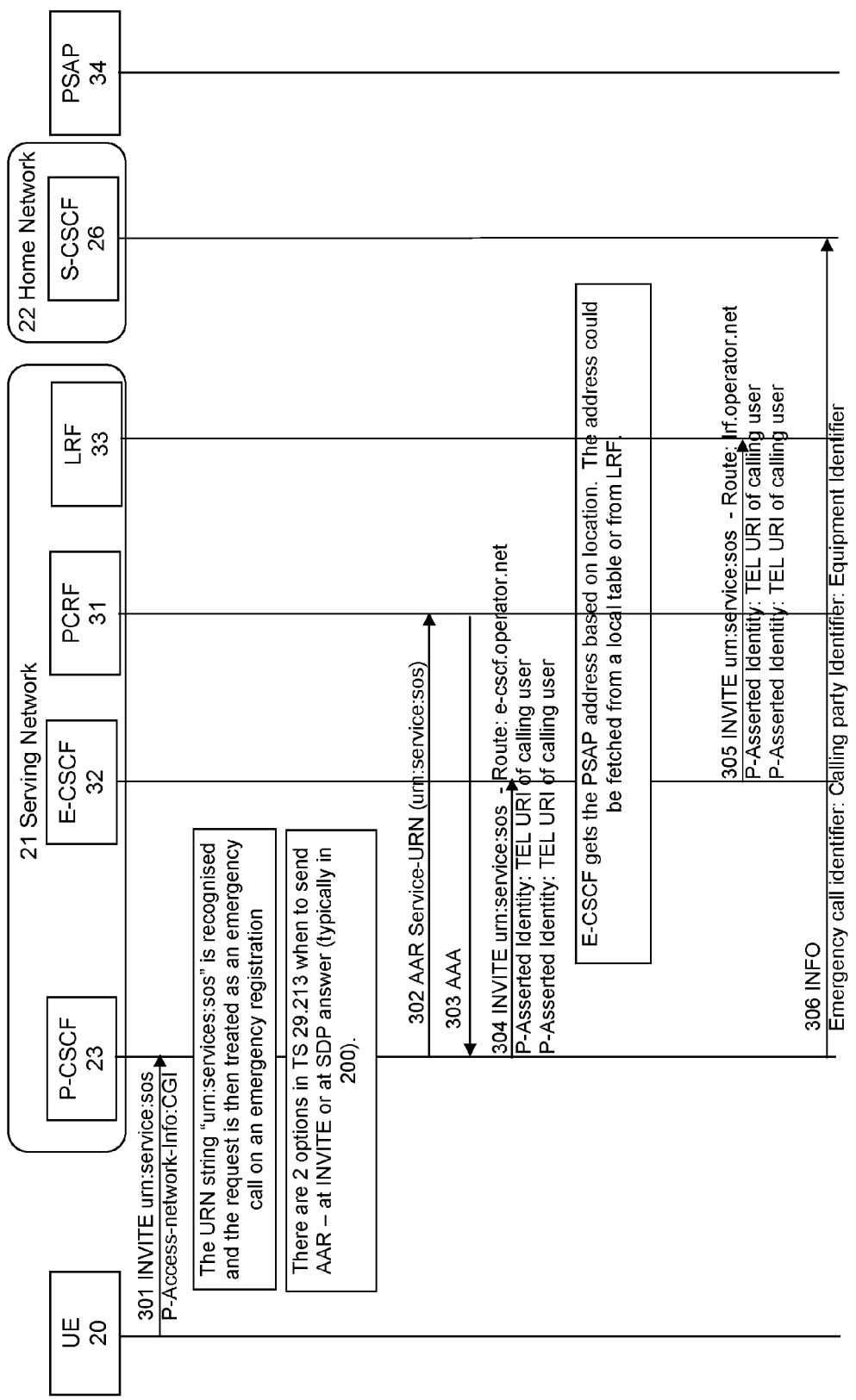
FIG. 3 is a signal diagram illustrating a procedure for establishing an Emergency call on an Emergency Registration.

Referring to FIG. 3, where the same entities have the same reference numerals as in FIG. 2, the UE 20 initiates the emergency call by sending a SIP Invite 301, which is directed to the P-CSCF 23 in the serving (visited) network 21. As indicated in the figure, the Invite signal 301 comprises a URN string "urn.services:sos". By recognizing the URN string the Invite is treated as an emergency call. The signalling shown follows the specified procedures set out in TS 29.213, and includes an exchange of Authorisation signals—Authentication and Authorisation Request (AAR) 302 and Authentication and Authorisation Answer (AAA) 303, with a Policy and Charging Rules Function (PCRF) 31. As indicated in the figure, the AAR 302 may be sent upon receipt of an Invite or at Session Description Protocol (SDP) answer. An Invite signal 304 is then sent to the Emergency-CSCF (E-CSCF) 32 in the serving network 21, and thereafter the emergency session is routed through the E-CSCF 32 and not through the home network 22. An Invite signal 305 is also sent to a Location Register Function (LRF) 33, from which the E-CSCF obtains the address of the PSAP 34 to which the emergency call is to be sent. However, as indicated in the Figure, there are other possible ways that the address of the PSAP 34 could be obtained, e.g. the PSAP address may be fetched from a local table. If the LRF alternative is chosen a proprietary Sh interface may be used. Further, the LRF may provide the location of the UE in case this information is missing. Finally, P-CSCF 23 sends a SIP INFO message 306 to the S-CSCF 26 in the home network 22, which includes an emergency call indication, the calling party identity and the Equipment Identity of the UE 20, in the form, for example, of an equipment identifier provided in an instance ID or Globally Routable User Agent URI (GRUU) as provided by the UE during emergency call establishment. An instance ID is a Uniform Resource Name (URN) generated by a device that uniquely identifies the specific device amongst all other devices, and does not contain any information pertaining to the user. The S-CSCF 26 stores information received in the message 306 for a predetermined or configurable amount of time. The P-CSCF 23 may use other SIP methods, such as SIP MESSAGE to convey the information to the S-CSCF 26, instead of using SIP INFO 306. The information may also be provided to the S-CSCF 26 using a plurality of messages 306.

Figure 4:
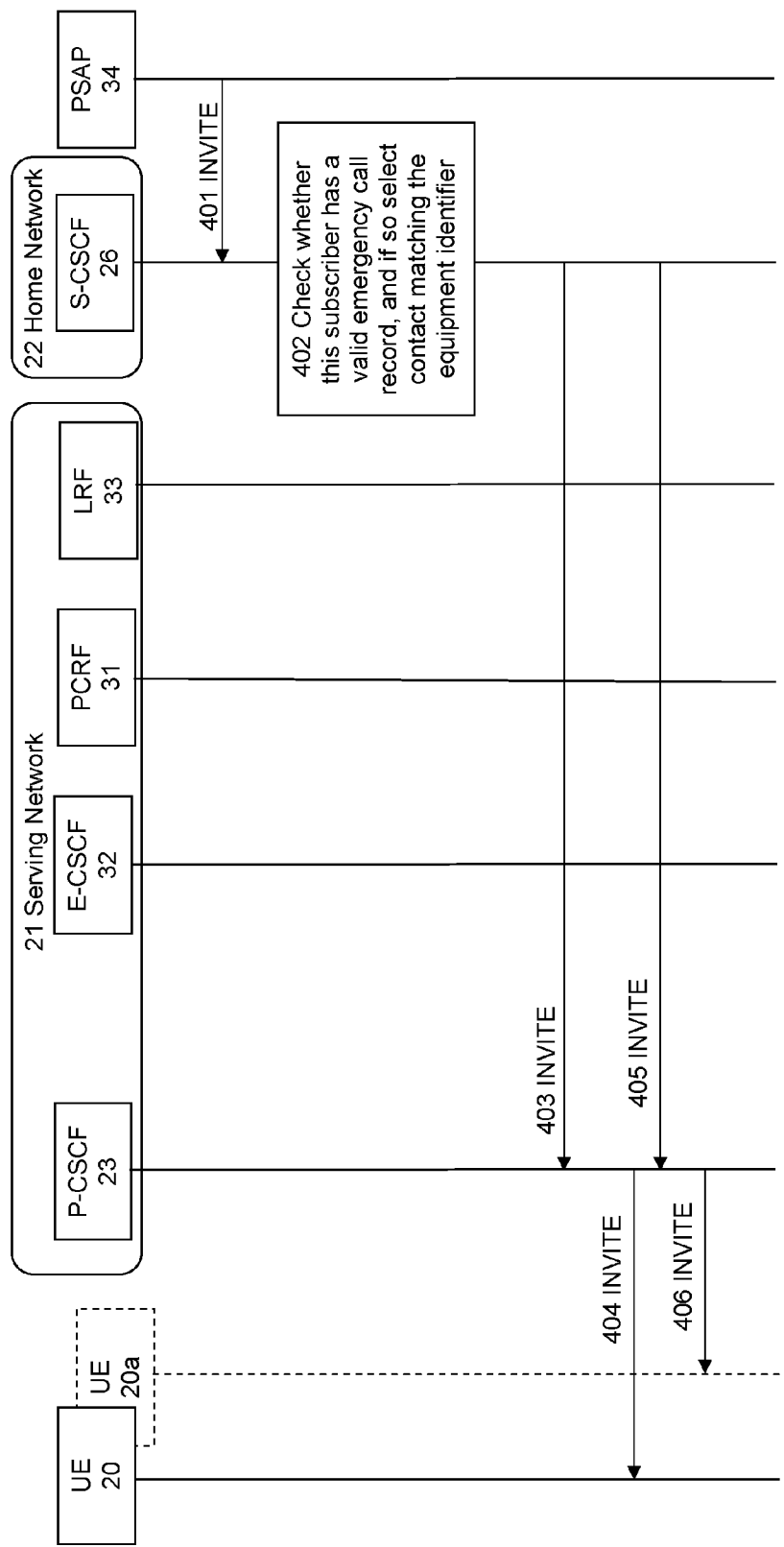
FIG. 4 is a signal diagram illustrating a procedure for an Emergency Call-back.

Referring now to FIG. 4, where the same entities have the same reference numerals as in FIGS. 2 and 3, the PSAP 34 attempts to make a call back to the UE 20 after the initial call has been terminated, either intentionally or unintentionally. The PSAP 34 sends an Invite 401 towards the user of UE 20, the Invite 401 comprising the called party identity i.e. the calling party identity of the user that initiated the emergency call. Unless the PSAP is an IP-PSAP with such functionality, the Invite will not comprise any equipment identity for the UE 20. In accordance with normal procedures for call routing via the IMS, the Invite is sent to the S-CSCF 26 that is serving the user of UE 20 and is in the user's home network 22. Now, at step 402, the S-CSCF 26 performs a check as to whether it has been informed of an emergency call performed by a subscriber with a calling party identity equal to the called party identity of the Invite 401, i.e. it is checked if the S-CSCF 26 has a registered public user identity equal to the called party identity of the Invite 401 and if so, an equipment identity of UE 20. If it has, then it can use the information to match the called party identity in the incoming Invite with the public user identity and equipment identity of the UE and then to route the call back to the UE. The S-CSCF 26 then forwards an Invite 403 to the P-CSCF 23 in the visited network, which forwards it on to the UE 20 (signal 404). The called-back call can then continue in the normal manner via the S-CSCF 26. Note that, sometimes, the S-CSCF only needs to know the equipment identifier. However, many times the equipment identifier does not always identify the user very well, and so it is preferable that it knows both the public user identity and the equipment identifier. In that case, when an incoming request is received for call-back to the user, the called party identity of the incoming Invite can first be used to find the user, and then for that user the equipment identifier can be used to select the terminal to route the call-back to.

When the PSAP 34 establishes a call-back (signal 401), this may arrive at the S-CSCF 26 either as a normal terminating call (without a call-back indication) or as a terminating call with a call-back indication, but in both cases without any equipment identifier of the UE 20 (i.e. the address includes only the user identity of the user). Where there is a call-back indication, the S-CSCF 26 checks (action 402) whether it has a record that this subscriber, i.e. user, has performed an emergency call and if so it tries to select a contact that fits to the equipment identifier of the user (e.g. by matching it to a GRUU, contact address or instance ID). If no such call-back indication is received, the S-CSCF 26 checks whether it has a record that this subscriber has performed an emergency call, but in some embodiments it only uses that information if a predefined/configured timeout has not expired. According to embodiments it may thus be defined for how long the S-CSCF 26 should keep the information provided by the P-CSCF. Also, if the S-CSCF 26 determines (e.g. based on the INFO previously sent) that an emergency call back is being performed, it may also suppress any services that should not be invoked during the call back. If the check in action 402 results in an equipment identity for the UE 20, the S-CSCF 26 sends an Invite 403 to the P-CSCF 23 in the visited network, which thereafter forwards it on to the UE 20 (signal 404).

According to some embodiments, the S-CSCF 26 also checks a database of preferred devices/numbers to call in addition to (parallel or sequential calling) or instead (alternative calling) in case of a call-back. This may be configured to always occur in the event of an emergency call-back, or to be used in cases where the originating UE 20 does not respond. This list of devices/numbers may be configured by the user or operator to ensure that an additional or alternative number is called in case of call-back. For example this number could be that of another device sharing the same IP Multimedia Public Identity, IMPU. E.g. in case of a home with several fixed phones, each being registered separately, this list could include all the IP Multimedia Private Identities, IMPIs, for these phones), thereby ensuring that the call-back reaches all phones in the same house. Other examples might include a parental number in case a child dials an emergency call, or a facility service in case of an emergency call dialled from a corporate phone. In such cases, the call is routed (signals 405 and 406 in FIG. 4) to the selected contact (illustrated by UE 20a in FIG. 4) either instead of, or in addition to routing the call (signals 403 and 404 in FIG. 4) to the UE 20. The terms phone and device should of course be seen as encompassed by the term UE.

Figure 5:
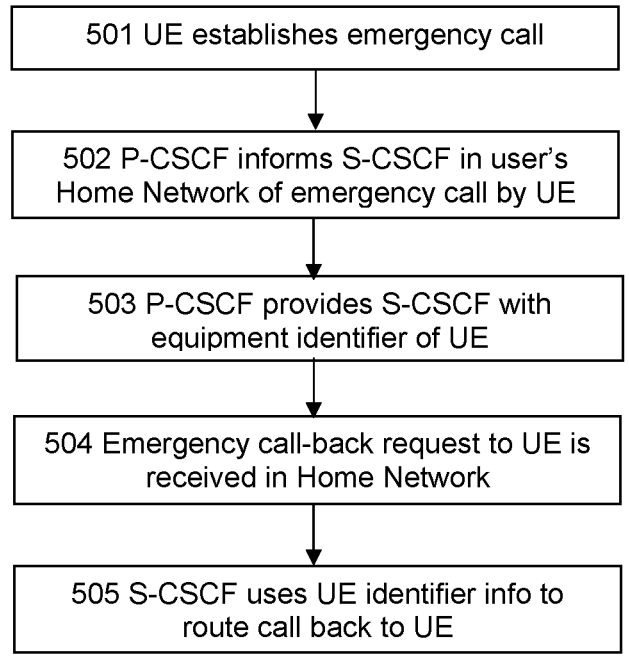
FIG. 5 is a flow diagram illustrating the steps in an Emergency Call-back procedure.

FIG. 5 is a flow diagram illustrating the method steps in an emergency call-back procedure. At step 501 a UE has established an emergency call, in accordance with current 3GPP specifications, i.e. an invite signal has been sent from the UE to a P-CSCF in a IMS network visited by the UE. At step 502 the P-CSCF through which the emergency call was established informs the S-CSCF in the UE user's Home Network that an emergency call has been established by the UE, i.e. after receipt of the invite signal from the UE, one or more messages informing the S-CSCF in the home IMS network of the emergency call is sent from the P-CSCF. Also, as shown at step 503, the P-CSCF provides the S-CSCF with an equipment identifier of the UE. The information provided in steps 502 and 503 comprises thereby at least an indication of the emergency call and an equipment identifier of the UE. This information can be provided in the form of one or more messages. At step 504 an emergency call-back request (Invite) is received in the S-CSCF in the UE user's Home IMS network. At step 505, the S-CSCF uses the UE identifier information it received from the P-CSCF in step 503 to route the emergency call-back to the UE. I.e. the S-CSCF matches the information comprised in the received emergency call-back request from the emergency call-centre with the UE equipment identifier information received from the P-CSCF to route the call-back to a UE.

Figure 6:
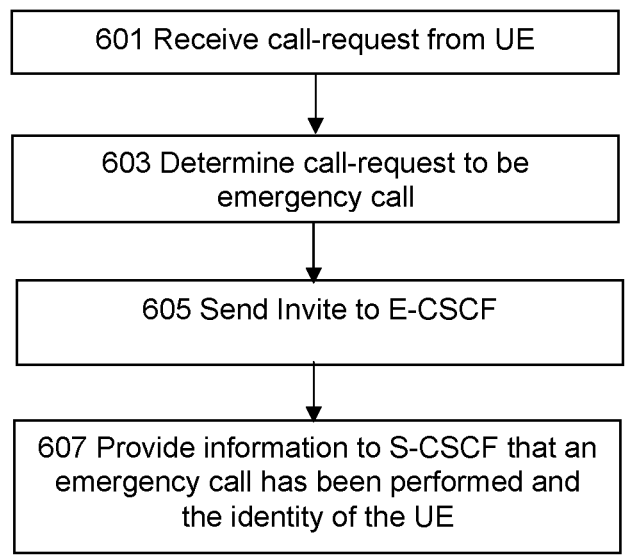
FIG. 6 is a flow diagram illustrating a procedure performed by a P-CSCF during establishment of an emergency call.

FIG. 6 is a flow diagram illustrating the method steps performed by a P-CSCF during establishment of an emergency call. In step 601 the P-CSCF receives an invite signal from a UE making an emergency call, i.e. an emergency call-request. In step 603 the P-CSCF determines the received invite signal to be an emergency call, e.g. by recognizing a URN string "urn.services:sos" in the invite signal. In step 605, after determining that the call is an emergency call, the P-CSCF sends an invite signal to an E-CSCF, enabling routing of the emergency call through the E-CSCF. In this way the steps 601-605 can be seen as the establishment of the emergency call from the UE. In step 607 the P-CSCF provides information to an S-CSCF, in a home IMS network for the UE. The information is preferably in the form of a notification comprising an indication of the emergency call and an equipment identifier of the UE. The information can be provided using one or more messages and should comprise that the user has established an emergency call with a particular equipment identifier (e.g., contact address, instance ID or GRUU). Step 607 may be performed after receiving the invite signal from the UE (step 601) and is performed after, or at the same time as, the invite is sent to the E-CSCF (step 605).

The above described method performed by the P-CSCF enable an emergency call-back to a UE making an emergency call, even if the emergency call-centre, that for some reason needs to make a call-back, does not support sending a call-back identifier or an equipment identifier. Further, the S-CSCF is informed that an emergency call takes place in the visited network without having the call to be routed through the home network. In this way the establishment of the emergency call does not involve excessive signalling and also being in accordance with current regulations.

Figure 7:
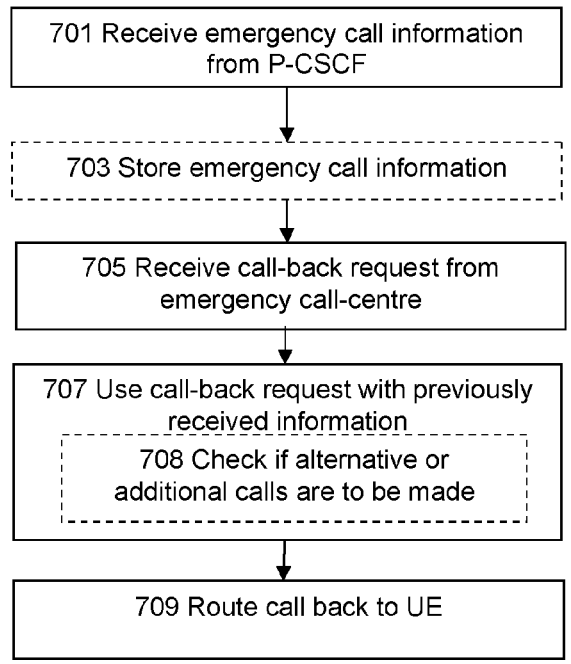
FIG. 7 is a flow diagram illustrating the method steps performed by an S-CSCF during establishment of an emergency call from a UE as well as during a call-back procedure.

FIG. 7 is a flow diagram illustrating the method steps performed by an S-CSCF during establishment of an emergency call from a UE as well as during a call-back procedure. In step 701 the S-CSCF receives information from a P-CSCF located in a network that the UE is visiting. The received information comprises an indication that an emergency call has been made and an equipment identifier of the UE. In step 703 the information regarding the emergency call and the equipment identifier of the UE may be stored/cached in a memory. The S-CSCF may set a timer, or the information received from the P-CSCF may include timer information, defining how long the information should be kept in the memory.

The above described steps 701 and 703 are performed by the S-CSCF during the setup of the emergency call. After establishment of the emergency call, an emergency call-centre, such as a PSAP, may need to initiate a call-back to the UE making the emergency call. Then the S-CSCF, in step 705, receives the emergency call-back request from the emergency call-centre, the call-back comprising at least the called party identity, i.e. the public user identity of the user the call-back is to be sent to, but lacks equipment identifier information for the UE that made the emergency call. In step 707 the S-CSCF checks whether the called party identity matches any emergency call record. I.e. a check is performed determining if the called party identity included in the call-back request matches any information that was received in step 701 and subsequently stored in the memory in step 703. If there is a match, the S-CSCF is able to route the call-back to the P-CSCF in the network in which the UE is located and further to the UE by using the information provided by the P-CSCF and the information in the call-back request. According to some embodiments the step 707 further includes a step 708 in which a database is checked, the database comprising preferred devices and/or numbers to call in addition to or instead of the UE that made the emergency call. This step may be configured to always occur in the event of an emergency call-back, or to be used in cases where the originating UE does not respond. This database may be in the form of a table and may be associated with, or incorporated in, the memory comprising the information stored in step 703. In step 709, if the S-CSCF has the necessary information, i.e. if there is a match, the S-CSCF routes the call-back to a UE based on said matching. The database as well as the memory may be provided in the S-CSCF or in a separate entity.

The above described method performed by the S-CSCF enables and performs an emergency call-back to a UE having made an emergency call, despite the UE being located in a visited IMS network. Further the method is able to perform an emergency call-back to a UE having made an emergency call even if the emergency call-centre, that for some reason needs to make the call-back, does not support sending a call-back identifier or an equipment identifier to the S-CSCF. Further, the S-CSCF is informed that an emergency call takes place in the visited network without having to route the initial emergency call through the home network. In this way the establishment of the emergency call does not involve excessive signalling while being in accordance with current regulations.

Figures 8, 9:
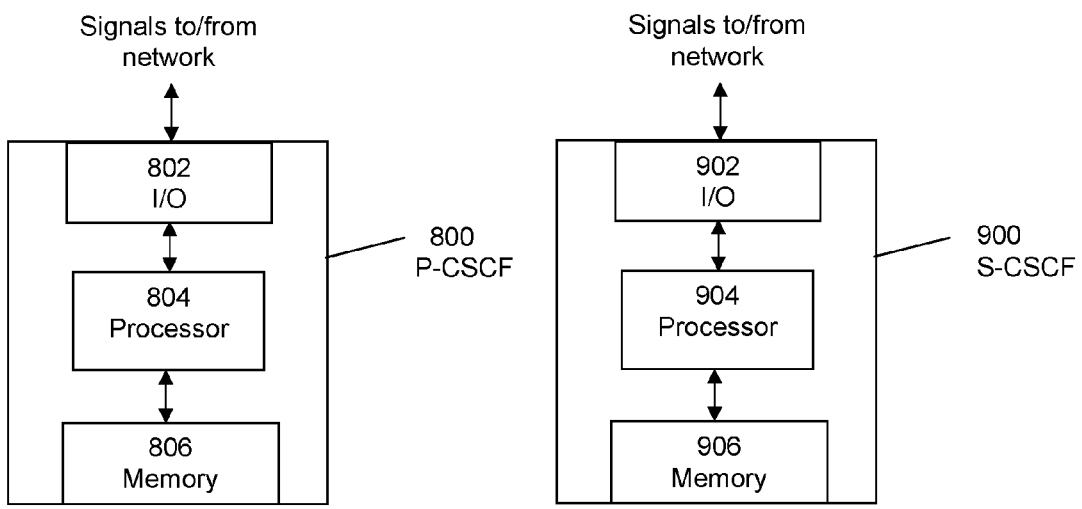
FIG. 8 is a schematic block diagram of a network entity, such as a P-CSCF, configured to implement aspects of the Emergency Call-back procedures.
FIG. 9 is a schematic block diagram of a network entity, such as an S-CSCF, configured to implement aspects of the Emergency Call-back procedures.

FIG. 8 is a schematic block diagram of a network entity 800, configured to implement aspects enabling the emergency call-back procedures described above. The network entity 800 includes an interface 802 for receiving and transmitting signals to/from other network entities. A memory 806 stores data and program instructions. A processor 804 is configured to process the program instructions. In one embodiment, the network entity 800 is an entity in a visited IMS network, preferably a P-CSCF 23. The program instructions stored in the memory 806 and processed by the processor 804 detect receipt of a request to establish an emergency call from a UE accessing the visited network, and route the emergency call to an emergency call-centre. The program instructions also configure the network entity to inform an S-CSCF in the user's IMS Home network that an emergency call has been established in the visited IMS network as well as the identity of the UE.

In some embodiments the processor 804 is configured to inform the S-CSCF of the established emergency call and the equipment identity after the emergency call has been routed to an emergency call-centre, i.e. after an invite signal 304 has been sent to the E-CSCF.

In some embodiments the processor 804 is configured to inform the S-CSCF of the established emergency call and the equipment identity in form of a SIP message. The information may also comprise a public user identity of the calling party.

FIG. 9 is a schematic block diagram of a network entity 900, configured to implement aspects of the emergency call-back procedures described above. The network entity 900 includes an interface 902 for receiving and transmitting signals to/from other network entities. A memory 906 stores data and program instructions. A processor 904 is configured to process the program instructions. The network entity 900 is an entity in a home network of a subscriber, preferably an S-CSCF 26. The program instructions configure the entity to receive an indication that a UE of the subscriber/user has established an emergency call which has been routed to an emergency call centre via a visited network, together with an equipment identifier of the UE, and preferably store the received indication in the memory 906. The above mentioned information could also be stored in an entity separate from the network entity 900—however this would cause more signalling in the network. The program instructions also configure the network entity 900, when receiving an emergency call-back request sent from the emergency call-centre, to use the stored UE equipment identifier information to route the call back to the UE.

In some embodiments the processor 904 is configured to use information comprised in the received emergency call-back request in order to match an identity of a called party included in the emergency call-back request with an equipment identifier of the UE, and then route the call-back to the UE.

In some embodiments the processor 904 is configured to use information comprised in the received emergency call-back request in order to match an identity of a called party included in the emergency call-back request with an equipment identifier of the UE; thereafter check if an alternative or additional call is to be made to a further UE; and if so route the alternative or additional call to the further UE.

It will be appreciated that at least the following new procedures have been introduced to support the SRVCC emergency service.

The P-CSCF 23 in the visited network 21 informs the S-CSCF 26 in the user's home network 22 that the user has established an emergency call with a particular equipment identifier (e.g., contact address, instance ID or GRUU).

The S-CSCF 26 uses this information to route a terminating emergency call-back to the right device.

The S-CSCF 26 can have an additional list of numbers/UEs to which the call should be "forked" to, i.e. routed to either in parallel or in sequence, e.g. in case the UE from which the emergency call was made do not respond.

It is a particular advantage that these procedures enable an emergency call-back to a UE/device, even if the PSAP does not support sending a call-back identifier or an equipment identifier. I.e. the above mentioned procedures can be used even in systems having legacy emergency call-centres and without unnecessary involvement of an S-CSCF in the home network.

The invention claimed is:

1. A method of establishing an emergency call and an emergency call-back for a first User Equipment (UE) communicatively coupled to a visited Internet Protocol Multimedia Subsystem (IMS) network, the method comprising:

establishing an emergency call by the first UE sending an emergency call request to a Proxy Call Session Control Function (P-CSCF) in the visited IMS network, wherein the first UE is a mobile equipment operating in a telecommunication network and having a unique equipment identifier to identify the first UE;

sending, from the P-CSCF to an Emergency CSCF (E-CSCF) in the visited IMS network, an invite signal enabling routing of the emergency call through the E-CSCF in the visited IMS network without routing the emergency call through a Serving CSCF (S-CSCF) in a home IMS network of the first UE;

providing, from the P-CSCF to the S-CSCF in the home IMS network for the first UE, information comprising an indication that the emergency call has been performed by the visited IMS network and the equipment identifier of the first UE;

receiving, in the S-CSCF, an emergency call-back request from an emergency call-centre; and using, in the S-CSCF, information comprised in the received emergency call-back and the information provided by the P-CSCF, to route the emergency call-back to the first UE or to a second UE, or to both UEs.

2. A method of establishing an emergency call for a User Equipment (UE) communicatively to a visited Internet Protocol Multimedia Subsystem (IMS) network, the method enabling emergency call-back to the UE and, the method performed at a Proxy Call Session Control Function (P-CSCF) in the visited IMS network, comprising:

receiving, from the UE, a call-request, wherein the UE is a mobile equipment operating in a telecommunication network and having a unique equipment identifier to identify the UE;

determining the received call-request to be an emergency call;

sending, to an Emergency CSCF (E-CSCF) in the visited IMS network, an invite signal enabling routing of the emergency call through the E-CSCF in the visited IMS network without routing the emergency call through a Serving CSCF (S-CSCF) in a home IMS network of the UE; and providing information to the S-CSCF in the home IMS network for the UE, the information comprising an indication that the emergency call has been performed by the visited IMS network and the equipment identifier of the UE, thereby enabling emergency call back to the UE.

3. The method according to claim 2, wherein said information is provided to the S-CSCF after the invite signal has been sent to the E-CSCF.

4. The method according to claim 2, wherein said information is provided in a form of a Session Initiation Protocol (SIP) message, the information further comprising a public user identity of the calling party.

5. A method of performing emergency call-back, wherein the method performed at a Serving Call Session Control Function (S-CSCF) located in a home Internet Protocol Multimedia Subsystem (IMS) network for a first User Equipment (UE), comprising:

receiving information from a Proxy Call Session Control Function (P-CSCF) located in an IMS network in which the first UE is visiting, the information comprising an indication that the first UE is making an emergency call in the visited IMS network and an equipment identifier of the first UE, wherein the first UE is a mobile equipment operating in a telecommunication network and the equipment identifier of the first UE is a unique equipment identifier to identify the first UE, and wherein the P-CSCF has sent to an Emergency CSCF (E-CSCF) in the visited IMS network, an invite signal enabling routing of the emergency call through the E-CSCF in the visited IMS network without routing the emergency call through the S-CSCF in the home IMS network of the first UE;

receiving an emergency call-back request from an emergency call-centre;

using information comprised in the received emergency call-back with the received information from the P-CSCF when routing the call-back to the first UE or to a second UE or to both UEs.

6. The method according to claim 5, wherein using information comprised in the received emergency call-back comprises matching an identity of a called party included in the emergency call-back request with the equipment identifier of the first UE, and said routing comprises routing the call-back to the first UE.

7. The method according to claim 5, wherein using information comprised in the received emergency call-back further comprises:

determining whether an alternative or additional call is to be made to the second UE; and in response to determining the alternative or additional call is to be made, routing the alternative or additional call to the second UE.

8. The method according to claim 5, further comprising storing the information comprised in the received emergency call-back in a memory.

9. The method according to claim 5, wherein the equipment identifier is provided in an instance identity (ID) or a Globally Routable User Agent Uniform Resource Identifier (GRUU).

10. A Proxy Call Session Control Function (P-CSCF) of an Internet Protocol Multimedia Subsystem (IMS) network, the P-CSCF comprises:

an interface for transmitting and receiving Session Initiation Protocol (SIP) messages;

a memory for storing data and programming instructions; and a processor for executing the programming instructions, the processor being coupled to the interface and configured to:

receive, from a User Equipment (UE) visiting in the IMS network of the P-CSCF, a call-request, wherein the UE is a mobile equipment operating in a telecommunication network and having a unique equipment identifier to identity the UE;

determine the received call-request to be an emergency call;

send, to an Emergency CSCF (E-CSCF) in the IMS network of the P-CSCF, an invite signal enabling routing of the emergency call through the E-CSCF without routing the emergency call through a Serving CSCF (S-CSCF) in a home IMS network of the UE; and provide information to the S-CSCF in the home IMS network for the UE, the information comprising an indication that the emergency call has been performed and the equipment identifier of the UE, thereby enabling emergency call back to the UE.

11. The P-CSCF according to claim 10, wherein the processor is further configured to provide said information to the S-CSCF after the invite signal has been sent to the E-CSCF.

12. The P-CSCF according to claim 10, wherein the processor is further configured to provide said information to the S-CSCF in a form of a SIP message, the information further comprising a public user identity of the calling party.

13. A Serving Call Session Control Function (S-CSCF) of an Internet Protocol Multimedia Subsystem (IMS) network, the IMS network being a home IMS network for a first User Equipment (UE), the S-CSCF comprises:

an interface for transmitting and receiving Session Initiation Protocol (SIP) messages;

a memory for storing data and programming instructions; and a processor for executing the programming instructions, the processor being coupled to the interface and configured to:

receive information from a Proxy Call Session Control Function (P-CSCF) located in an IMS network in which the first UE is visiting, the information comprising an indication that the first UE is making an emergency call in the visited IMS network and an equipment identifier of the first UE, wherein the first UE is a mobile equipment operating in a telecommunication network and the equipment identifier of the first UE is a unique equipment identifier to identify the first UE, and wherein the P-CSCF has sent to an Emergency CSCF (E-CSCF) in the visited IMS network, an invite signal enabling routing of the emergency call through the E-CSCF in the visited IMS network without routing the emergency call through the S-CSCF in the home IMS network of the first UE;

receive an emergency call-back request from an emergency call-centre;

use information comprised in the received emergency call-back with the information received from the P-CSCF to route the call-back to the first UE or to a second UE, or to both UEs.

14. The S-CSCF according to claim 13, wherein the processor is further configured to:
use information comprised in the received emergency call-back in order to match an identity of a called party included in the emergency call-back request with an equipment identifier of the first UE; and
route the call-back to the first UE.

15. The S-CSCF according to claim 13, wherein the processor is further configured to:
use information comprised in the received emergency call-back in order to match an identity of a called party included in the emergency call-back request with the equipment identifier of the first UE;
determine whether an alternative or additional call is to be made to the second UE; and
in response to determining the alternative or additional call is to be made, route the alternative or additional call to the second UE.

16. The S-CSCF according to claim 13, wherein the processor is further configured to store the information comprised in the received emergency call-back in the memory.

* * * * *